United States Patent

[11] 3,588,481

| [72] | Inventor | Larry J. Stroman |
| | | Houston, Tex. |
| [21] | Appl. No. | 820,872 |
| [22] | Filed | May 1, 1969 |
| [45] | Patented | June 28, 1971 |
| [73] | Assignee | Daniel Industries, Inc. |
| | | Houston, Tex. |

[54] DIGITAL MULTIPLYING CIRCUIT
12 Claims, 9 Drawing Figs.

[52] U.S. Cl. ................................................. 235/151.34,
73/195, 235/150.52
[51] Int. Cl. ............................................................ G01f
[50] Field of Search ............................................ 235/151.34,
150.52, 164, 161, 162, 194; 73/194, 188, 199;
137/551

[56] References Cited
UNITED STATES PATENTS

| 3,096,434 | 7/1963 | King | 235/151.34X |
| 3,299,258 | 1/1967 | Borseboom et al. | 235/151.34 |
| 3,376,744 | 4/1968 | Kister et al. | 235/151.34X |
| 3,445,643 | 5/1969 | Schmoock et al. | 235/151.34X |

*Primary Examiner*—Malcolm A. Morrison
*Assistant Examiner*—Edward J. Wise
*Attorneys*—Arnold, Roylance, Kruger and Durkee, Tom Arnold, Donald C. Roylance, Walter Kruger, Bill Durkee, Frank S. Vaden, III and Darryl M. Springs ABSTRACT: This application discloses a digital multiplying circuit for use in correcting actual fluid volume measurements to a standard volume by receiving an analog signal representative of at least one of the parameters of pressure and temperature, digitizing the analog signal, multiplying the digitized signal representative of the measured parameters by a digital signal representative of the actual measured volume of fluid, and counting the digital pulse product for obtaining standard measure of the fluid volume.

FIG.1

Larry J. Stroman
INVENTOR

BY Arnold, Roylance,
Kruger & Durkee
ATTORNEYS

Larry J. Stroman
INVENTOR

BY Arnold, Roylance,
Kruger & Durkee
ATTORNEYS

DIGITAL MULTIPLYING CIRCUIT

BACKGROUND OF THE INVENTION

In the measurement of fluids, the measurement is, of course, made at existing conditions. However, in certain technologies, such as the petroleum industry, the accurate measurement of fluid petroleum products is of great economic importance. Further, varying effects of pressure and temperature on the products must be noted, if accurate measurements of fluid volume and flow are to be made.

Gases, of course, are highly compressible and are therefore greatly affected by varying pressures. Temperature is a factor in the accurate measurement of gases, but not nearly as important as it is in the measurement of liquids, which are incompressible under most conditions. Having a measured volume of gas, and knowing the pressure and temperature at which the measurement was made, a corrected measure of the volume of gas may be obtained by using the following equation:

$$Q_{SCF} = Q_{ACF} \frac{P}{P_B} \frac{T_B}{T}$$

where: $Q_{SCF}$ represents the desired standard volume of gas in cubic feet;

$Q_{ACF}$ represents the actual measured volume of gas in cubic feet;

P represents the pressure of the gas measured;

$P_B$ is the base pressure at which standard cubic feet of gas are measured;

$T_B$ is the base temperature at which standard cubic feet of gas are measured; and T is the temperature at which the actual gas measurements were made.

To correct liquids for temperature, however, is more complicated. There are ASA tables which graphically determine a standard gallon or barrel of liquid measured at existing temperature for a liquid of a known specific gravity.

In practice, it has long been common, especially in the petroleum industry to use mechanical ball disc integrators to perform the desired pressure and temperature corrections on gaseous and liquid products. The ball disc integrators, being a species of mechanical tool, are subject to wear and have accuracy limitations. It is difficult to reduce the margin of error below 1 percent. Further, the ball disc integrators are complex mechanical instruments, and are difficult to calibrate. Such calibration must be performed in the laboratory necessitating the removal of the device in the field.

Accordingly, Applicant has devised an electronic digital multiplying means for translating actual fluid measurements into standard measurements and compensating for temperature and pressure.

SUMMARY OF THE INVENTION

In accordance with the invention, there is provided a novel digital multiplying means for correcting actual fluid measurements to standard measurement units by compensating for the pressure and temperature at which the actual measurement was made. A digitizing circuit is provided for receiving at least one of the parameters of pressure and temperature and generating a digital signal representative of the magnitude of the received parameters. The digital signal is applied to a multiplying circuit for multiplication with incoming flowmeter pulses representative of the actual measured volume of fluid flow. The resultant multiplied digital signals are applied to a counting circuit the output of which is applied to a counter for registering the corrected volume of fluid flow at standard conditions.

Accordingly, one primary feature of the present invention is to provide a digital multiplying means for multiplying a digital signal by an analog signal which is digitized prior to multiplication.

Another feature of the present invention is to provide digital multiplying means for use in fluid measurement by digitizing an analog signal representative of at least one of the parameters of pressure or temperature and multiplying the resultant digital signal by another digital signal representative of a measured volume of fluid to obtain a resultant digital signal representing the volume of fluid corrected to standard conditions.

Still another feature of the present invention is to provide digital multiplying means adapted for multiplying the digital signals of several flowmeters by a digitized signal representing a common pressure for obtaining corrected standard measurements for each flowmeter.

Yet another feature of the present invention is to provide digital multiplying means adapted for obtaining a standard measured volume of a fluid for each of several flowmeters and to digitally add the resultant measured volumes to simultaneously obtain the total volume measured by all of the flowmeters.

Another feature of the present invention is to provide a digital multiplying means having a provision for at least one division input.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope for the invention may admit to further equally effective embodiments.

In the drawings.

DETAILED DESCRIPTION OF THE PREFERRED EMBODIMENTS

Figure 1:
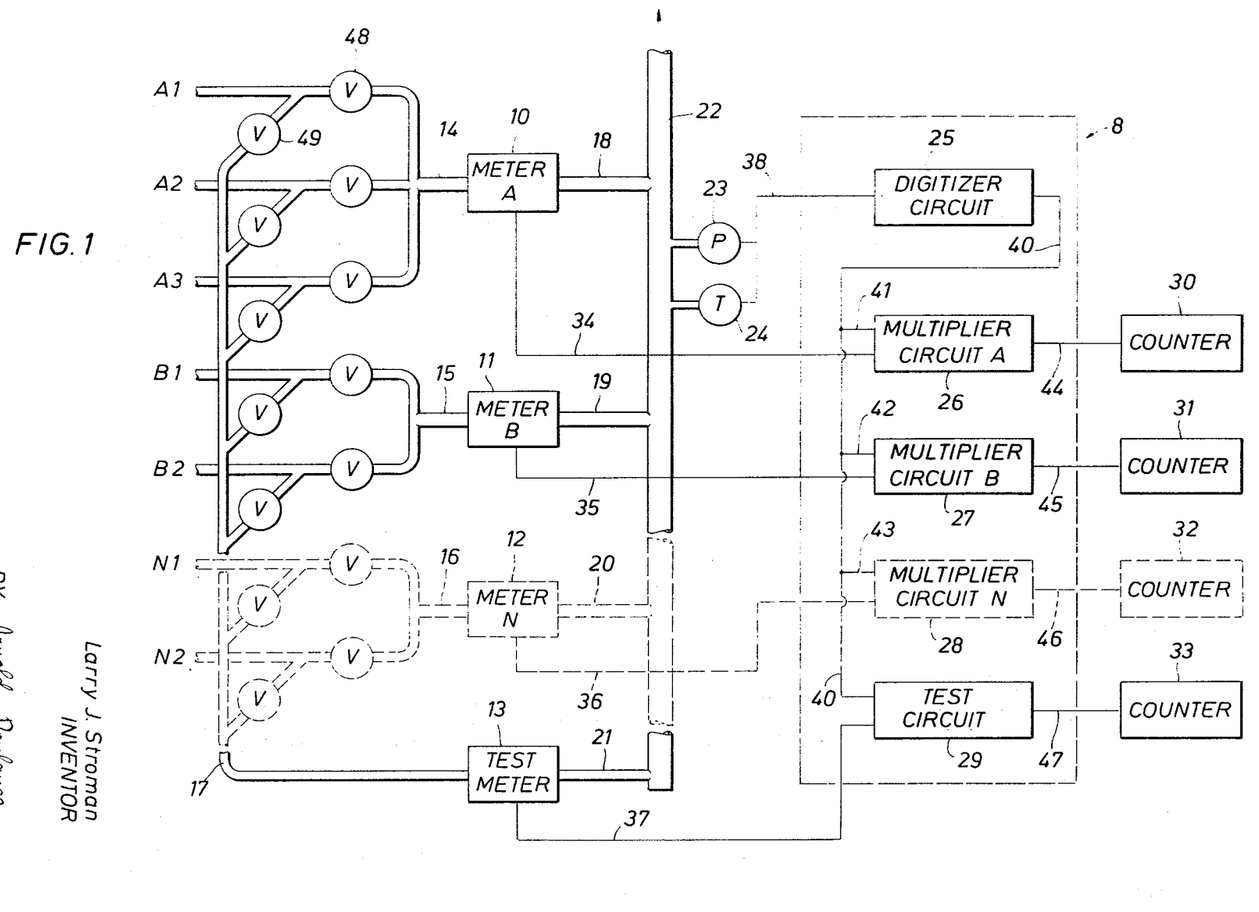
FIG. 1 is a schematic block diagram illustrating one embodiment of the digital multiplying means of this invention as it is utilized for converting actual fluid flow measurements in a pipeline to a standard measurement.

Referring now to FIG. 1, a schematic diagram illustrating the digital multiplier circuit according to the present invention is shown in combination with conventional fluid flowmeters.

Fluid products flowing in pipelines A1, A2 and A3 are directed to a conventional flowmeter 10 through valves 48 and pipe 14. The output of flowmeter 10 is connected through pipe 18 to a transfer pipeline 22 for distribution to a remote location. Similarly, pipelines B1 and B2 are shown directing the fluid flow through a pipeline 15 to a conventional metering device 11, whose output is directed via pipeline 19 to the transfer pipeline 22 as hereinabove described. Similarly, any additional number of pipes N1 and N2 carrying fluid products may channel such flow via a pipe 16 (shown in dotted lines) to a meter 12 (shown in dotted lines) and a pipe 20 (shown in dotted lines) and distributed to transfer pipe 22 as hereinbefore described.

The flow from any of the input lines A1, A2, A3, B1, B2, N1, or N2 may be individually directed to a test flowmeter 13 by shutting off the fluid flow in the appropriate pipeline by closing valve 48 and opening valve 49 to allow the selected flow to be diverted via pipe 17 to the test meter 13. This arrangement is commonly utilized in practice, and the test flowmeter 13 measures the fluid products moving through pipes 17 and 21 for calibration purposes. The output flow through the test flowmeter 13 is applied via pipe 21 to the transfer pipeline 22 for distribution as hereinbefore described. Note that the diverted flow of the selected input line, i.e., A1, A2, A3, etc., applied to the test flowmeter 13 is returned to the transfer pipeline 22 in order that the total flow through pipe 22 is not varied. However, the total flow in pipes 14, 15 or 16 would be reduced by the quantity of the diverted product flowing through pipeline 17, and hence, meter 10, 11 or 12 would be measuring only a portion of flow that would normally be present in its associated pipelines if a portion of the flow through that pipeline had not been diverted for test purposes.

Flowmeters 10, 11, 12 and 13 are typically positive displacement flowmeters when used in measuring gaseous or liquid products such as natural gas or oil. In addition, a turbine meter may be utilized when measuring the flow of liquid products such as oil. The flowmeters are adapted to produce an electrical signal, commonly by means of switch closures within the meter, that corresponds to a measured quantity of the fluid that has passed through the flowmeter.

A digital multiplying circuit 8 is shown having a digitizer circuit 25, identical multiplying circuits 26, 27, 28, etc., and a test circuit 29 for multiplying the respective meter readings of flowmeters 10, 11, 12 and 13 by functions of pressure or temperature for correcting the measured gas or liquid flow to a standard value, depending upon differences in pressure and/or temperature from standard conditions. The apparatus shown in FIG. 1 illustrates a typical combination of the digital multiplying means of the present invention as utilized to pressure compensate actual gas flowmeter readings to standard measurements at a selected base pressure according to the formula previously discussed:

$$Q_{SCF} = Q_{ACF} \frac{P}{P_B}$$

The gas pressure may be measured by a conventional pressure measuring device 23 which generates an electrical signal proportional to the measured pressure. The electrical signal representative of the actual pressure measurement is transmitted via conductor 38 as an input to the digitizer circuit 25. The electrical signals generated by flowmeters 10, 11, 12 and 13 are applied via conductors 34, 35, 36 and 37, respectively, as inputs to multiplying circuits 26, 27, 28 and 29, respectively. The pressure signal P is divided by the selected base pressure $P_B$ in digitizer circuit 25 and converted to a digital signal representative of the function $P/P_B$ and applied via conductor 40 to the test multiplying circuit 29, and via conductors 40 and 41 to multiplying circuit 26, via conductors 40 and 42 to multiplying circuit 27, and via conductors 40 and 43 to conversion circuit 28 (shown in dotted lines to represent N number of additional channels that may be utilized). The corrected flowmeter signals are applied via conductors 44, 45, 46 and 47 to counters 30, 31, 32 and 33, respectively, for displaying the measured gas flow in standard measurement units.

As will be hereinafter explained, if a portion of the gas flow from any of the incoming pipeline inputs is diverted to pipeline 17 for test flow measurement, the pressure compensator unit 8 has the capability of registering the corrected test flow at the test counter 33 and also add the standard measurements obtained in the test circuit 29 back into the appropriate conversion circuit 26, 27 or 28, corresponding to the meter measurement from which the flow was taken.

Figure 2:
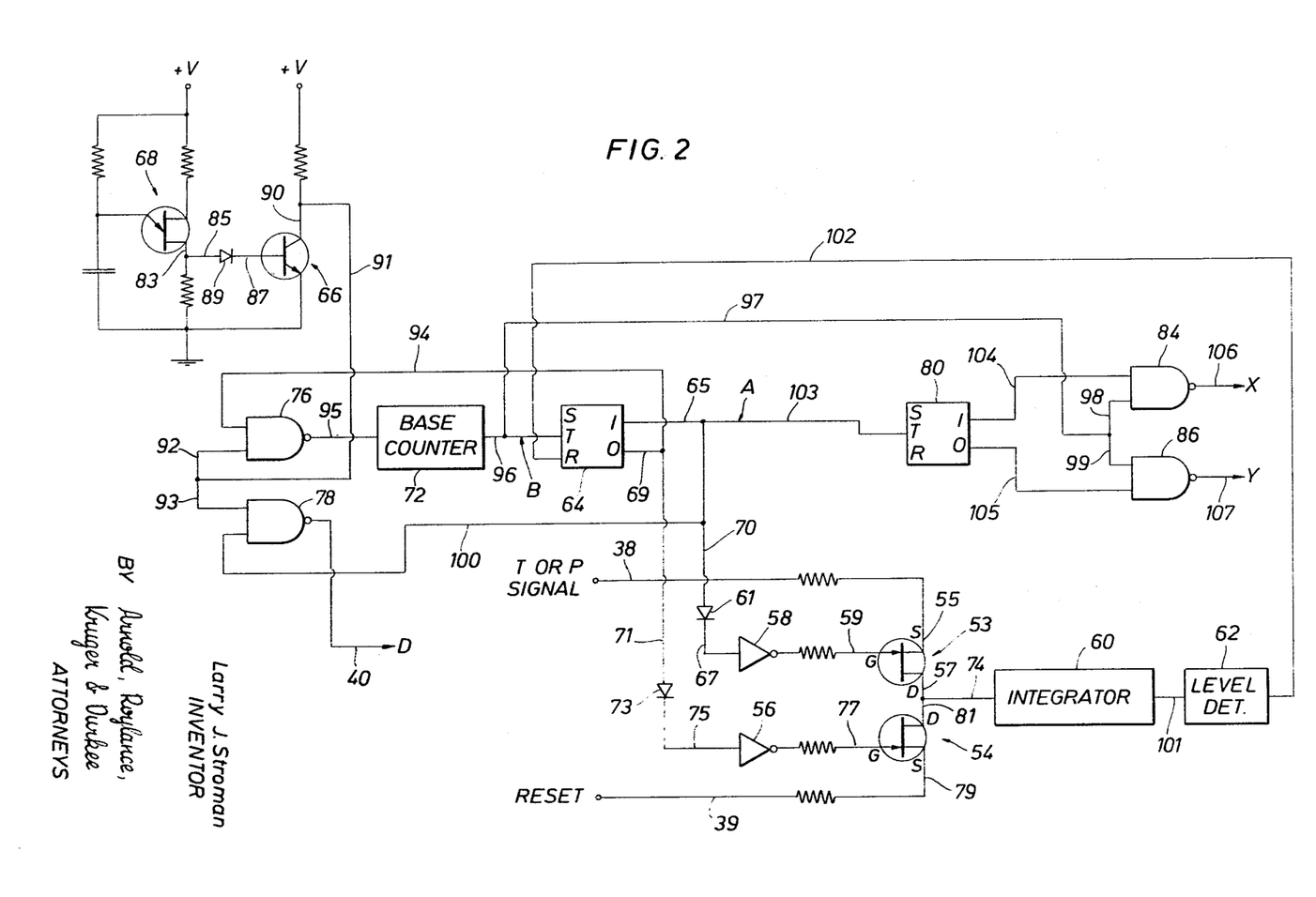
FIG. 2 is an electrical schematic of the digitizer circuit of the digital multiplying means.

A detailed schematic of the digitizer circuit 25 is shown in FIG. 2. The circuit consists of an input switching circuit comprised of inverters 56 and 58 and field-effect transistors 53 and 54, an integrator network 60, a level detector 62, a control circuit comprising the bistable multivibrators 64 and 80 and NAND gates 84 and 86, an oscillator circuit comprising transistors 66 and 68, an oscillator gating network comprising NAND gates 76 and 78, and a base counter 72 that functions as a timing device for the control circuit. The input signal to the switching circuit is an electrical signal representing pressure, as measured by pressure device 23 (see FIG. 1) and is applied via conductor 38 to the source lead 55 of the field-effect transistor 53. A preselected reset voltage is applied via conductor 39 to the source lead 79 of a field-effect transistor 54. The drain leads 57 and 81 of transistors 53 and 54, respectively are connected to conductor 74 and applied as an input to integrator circuit 60. The output of the integrator 60 is applied via conductor 101 to the input of level detector 62, the output of which is in turn applied to the reset input of bistable multivibrator 64 via conductor 102. The switch operation of field-effect transistors 53 and 54 are controlled by the state of the bistable multivibrator 64 as will be hereinafter more particularly explained.

The 1 output of bistable circuit 64 is applied as an input to a conventional inverter circuit 58 via conductors 56 and 70, diode 61 and conductor 67. The 0 output of bistable circuit 64 is applied as an input to a conventional inverter circuit 56 via conductors 69 and 71, diode 73 and conductor 75. The outputs of inverters 56 and 58 are applied via conductors 77 and 59 to the gate leads of field-effect transistors 53 and 54, respectively.

The oscillator circuit utilized is a basic relaxation oscillator employing a unijunction transistor 68. In the configuration shown, the output of the relaxation oscillator is applied via one of the base leads 83 of unijunction transistor 68, conductors 85 and 87, and diode 89 to the base of an NPN transistor stage 66. Transistor 66 is normally biased to cut off, but conducts when the positive going pulses from base 83 of transistor 68 are applied to the base of transistor 66. The output of the collector lead 90 of transistor 66 is applied via conductors 91 and 92 as one input of NAND gate 76 and via conductors 91 and 93 as one input of NAND gate 78. The 0 output of bistable circuit 64 is also applied via conductors 69 and 94 to the other input of NAND gate 76. The oscillator pulse output from NAND gate 76 is applied via conductor 95 to a base counter 72 which counts the number of pulses passed by gate 76.

The base counter 72 may be any conventional counting circuit of sufficient capacity to count the oscillator pulses passed by gate 76 and provide a sufficient time delay for the application of the input pressure signal to the integrator 60 as will be hereinafter explained in greater detail. In the preferred embodiment, two divide-by-16 circuits are cascaded to enable the counter 72 to count 256 discrete pulses. When the counter has achieved its capacity, an output pulse is generated and applied via conductor 96 to the trigger input of bistable circuit 64 for changing the state of bistable device 64 and controlling the switch operation of transistors 53 and 54.

The oscillator output is also applied via conductors 91 and 93 to one input of NAND gate 78. The other input to gate 78 is connected to the 1 output of bistable circuit 64 via conductors 65, 70 and 100. The state of bistable circuit 64 also controls gates 76 and 78. When NAND gate 76 is enabled, the oscillator pulses are passed by gate 76 to the base counter as previously described. When NAND gate 78 is enabled, the oscillator pulses are passed via conductor 40 to the multiplying circuits as the digitized function of the input pressure for purposes to be more fully explained.

The 1 output of bistable circuit 64 is also applied via conductors 65 and 103 to the trigger input of another bistable circuit 80 which controls the operation of NAND gates 84 and 86 via conductors 104 and 105, respectively. The output of base counter 72 is also applied via conductors 96, 97 and 98 to the other input of gate 84, and via conductors 96, 97 and 99 to the other input of gate 86. The output of gates 84 and 86 are applied out through conductors 106 and 107, respectively.

For purposes of explaining the circuit operation, a positive logic will be assumed, using the terms "high" and "low" to indicate a positive voltage and a substantially zero voltage, respectively. Of course, it may be seen by one skilled in the art that any desirable logic convention may be utilized with appropriate changes in biasing and polarity of voltage sources.

Figure 4:
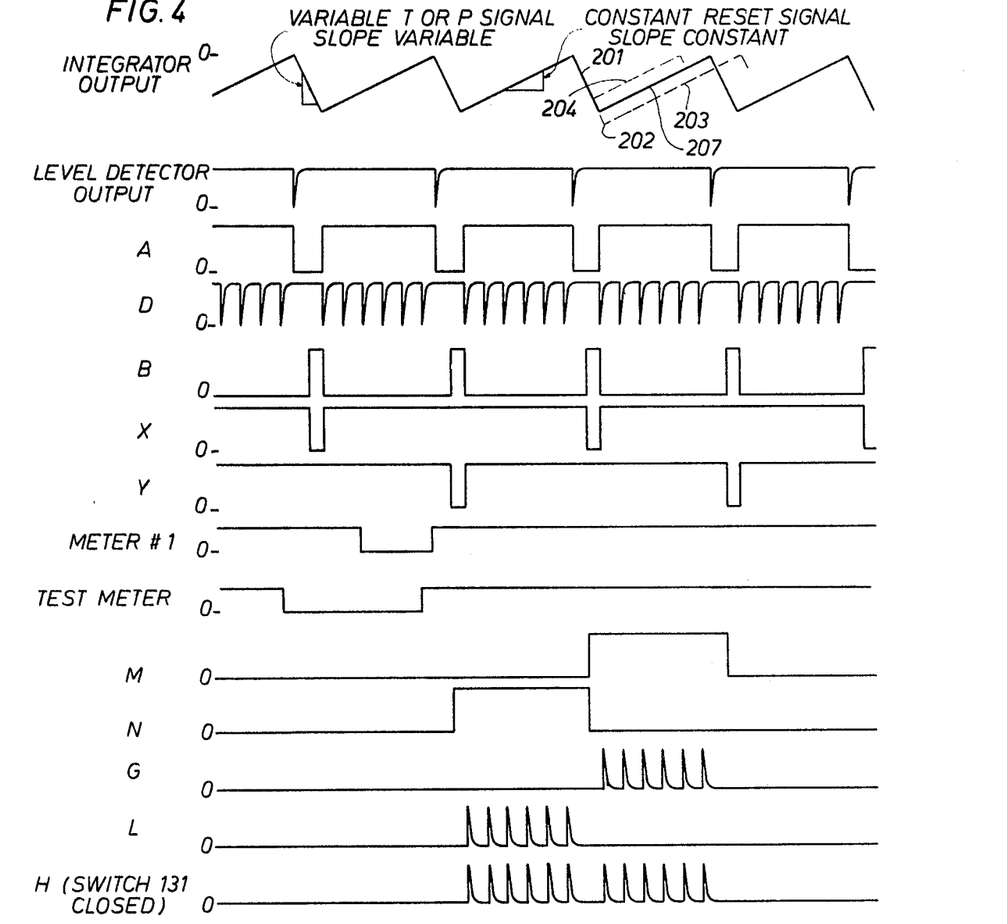
FIG. 4 is a pulse diagram illustrating the time relationship between the integrator signal waveform and key control pulses of the digitizer and multiplying circuits.

Referring now to FIGS. 1, 2 and 4, the operation of the digitizer circuit will be explained in detail. Assuming that the 1 output of bistable circuit 64 is low, diode 61 is reverse biased and blocks the application of the low 1 output of bistable circuit 64 as an input to inverter 58. Inverter 58 may be a conventional common-emitter circuit biased so that it is normally conducting. In the circuit shown, the inverter 58 is assumed to be a transistor whose output is at ground potential or 0 volts. With ground potential of 0 volts applied to the gate lead 59 of transistor 53, and with a positive input signal, representative of pressure applied via source lead 55 through conductor 38, the field-effect transistor 53 has a very low reverse bias, thereby allowing maximum conduction. The output of transistor 53 is applied via conductors 57 and 74 to the integrator circuit 60, a conventional integrating circuit including an operational amplifier and an RC circuit for accomplishing the integration process. The pressure signal applied as an input to the integrator circuit 60 produces a negative going output signal from the integrator having a variable slope depending on the magnitude of the input signal. (see FIG. 4).

At the same time the low 1 output of bistable circuit 64 is applied to diode 61, the high 0 output of bistable circuit 64 is applied via conductor 71 to the anode of diode 73 and via conductor 75 as a positive signal level input to inverter 56. Inverter 56 is a conventional common-emitter circuit identical to inverter 58 previously described. With a high input to inverter 56, inverter 56 is nonconducting and the inverter output will be negative with respect to ground potential thereby reverse-biasing the field-effect transistor 54 and pinching off the flow of current through transistor 54, and effectively switching off the negative reset voltage applied via conductor 39.

Transistor 53 will continue to conduct and apply the input signal to integrator circuit 60 as long as the 1 output of bistable circuit 64 remains low. However, when bistable circuit 64 is triggered to its other state, the 1 output becomes high and the 0 output goes low, thereby reversing the switching action of transistors 53 and 54. With this change in state of bistable device 64, inverter 58 becomes nonconducting and a negative voltage is applied to the gate lead 59 of transistor 53, thereby highly reverse biasing the transistor and pinching off the input pressure signal. However, transistor 54 is now conducting and the negative reset voltage via conductor 39 is coupled to the source lead 79 of transistor 54, whose output is applied via conductors 81 and 74 as an input to integrator circuit 60. The application of the negative reset signal to integrator 60 causes the integrator output signal to rise from a negative value toward 0 volts at a constant slope determined by the preset value of the reset voltage (see FIG. 4).

With the 1 output of bistable circuit 64 low, (see FIG. 4 and the waveform shown as A and taken at A in FIG. 2) transistor 54 pinches off the reset voltage and the input pressure signal is passed by the conducting switching transistor 53. The high 0 output of bistable circuit 64 is applied via conductor 94 to enable NAND gate 76 and allow the gate to pass the positive input oscillator pulses to base counter 72. The low 1 output of bistable circuit 64 disables NAND gate 78. As soon as the base counter 72 has reached its capacity, an output pulse is generated and applied to the trigger input of bistable circuit 64, thereby causing the 1 output to go high and the 0 output to go low. When bistable circuit 64 is triggered, the input pressure signal is switched off by the action of transistor 53 as previously described and the predetermined reset negative voltage is applied to integrator 60 as hereinabove described. Simultaneously, the high 1 output of bistable circuit 64 enabled NAND gate 78 via conductors 65 and 100, allowing the oscillator pulses to be passed through gate 78 and applied to the multiplying circuits (see FIG. 1) via conductor 40, as D pulses, for purposes to be hereinafter more fully described.

The output signal of the integrator circuit 60, as previously described, is a negative going waveform having a variable negative slope determined by the magnitude of the input pressure signal applied via conductor 38. The input signal is applied to the integrator 60 for a fixed time period, i.e., the time during which the 1 output of bistable circuit 64 is low, and the base counter 72 is counting its capacity of pulses from the oscillator circuit. Therefore, the negative going waveform at the output of the integrator will occur during this time period. When base counter 72 triggers bistable device 64 and switches off the input signal applied via conductor 38, the known negative reset voltage will be applied via conductor 39 and transistor 54 to integrator circuit 60. The integrator output signal then becomes a positive going waveform having a constant positive slope determined by the magnitude of the predetermined negative reset voltage as may be seen in FIG. 4. The leading edge of the waveform shown at A goes from high to low when bistable circuit 64 is reset by the level detector as will be hereinafter explained, and the positive pressure signal is applied to integrator 60. When base counter 72 counts its capacity, a positive output signal as seen at B in FIG. 2 and shown as the B waveform in FIG. 4 returns to 0 volts in a negative going direction, thereby triggering bistable circuit 64. At the same time, the waveform at A (1 output of bistable device 64) returns to a high state, pinching off the pressure signal by the action of transistor 53 and applying the negative reset voltage as hereinbefore described. D pulses, from NAND gate 78 are now passed by gate 78.

When the integrator output signal is restored to a 0-volt level, the threshold level detector circuit 63 produces a negative pulse applied via conductor 102 to the reset input of bistable circuit 64, thereby resetting the bistable circuit. The level detector 62 may be any conventional circuit acting as a threshold detector and having a positive output as long as the input from the integrator 60 is negative, but producing a negative going pulse (see FIG. 4) as soon as the integrator output reaches 0 volts in the positive going direction. When the level detector resets bistable circuit 64, the input signals are again passed through field-effect transistor 53 to the input of integrator circuit 60 and the integrating cycle is repeated as hereinbefore described.

When bistable circuit 64 is reset, NAND gate 78 is disabled, the oscillator pulses are blocked, and the train of D pulses is stopped as shown in FIG. 4. Therefore, the output of NAND gate 78 will be a burst of discrete pulses during the time when the reset voltage is applied to integrator 60. Since the unknown input signal level is applied to integrator 60 during a discrete time period, i.e., the counting time of the base counter as reflected in the waveform A, the output signal of integrator 60 will reach an unknown maximum negative signal level just as bistable circuit 64 is triggered by the base counter 72. The negative reset voltage is then applied to the integrator 60 and restores the integrator output signal waveform from a maximum negative signal level to 0 volts and is therefore proportional to the unknown pressure input signal. In turn, the number of discrete pulses passed by NAND gate 78 is proportional to the time the reset voltage is applied to integrator 60 and is a measure of the input pressure signal level.

The cycle will be continuously repeated with NAND gates 76 and 78 alternately passing oscillator pulses via conductors 95 and 40 to the base counter 72 for determining the time period during which the input signal is applied to integrator circuit 60 or as D pulses proportional to the input pressure signal, respectively.

Bistable circuit 80 is triggered only when the 1 output of bistable circuit 64 goes low thereby dividing the signal frequency of bistable circuit 64 by two. When the 1 output of circuit 80 is high, NAND gate 84 is enabled and passes the base counter 72 output signal when received (see pulse B in FIG. 4). The counter output signal is passed through the enabled gate 84 and applied through conductor 106 to the conversion circuits as an X pulse for purposes to be hereinafter further described. When the 0 output of bistable device 80 is high, NAND gate 86 is enabled, and passes the base counter 72 output signal via conductor 107 as a Y pulse (see FIG. 4). The Y pulse will be utilized in the multiplying circuitry as will be hereinafter more particularly described. The NAND gates 76, 78, 84, and 86 may be any conventional NAND gate. Further, the bistable circuits 64 and 80 may be of any conventional bistable multivibrator design utilizing a conventional RST connection configuration.

The oscillator circuit was previously described as a relaxation oscillator. Of course, any conventional oscillator circuit may be employed without affecting the operation of digitizer circuit 25. Further, it will be noted that the output of the digitizer circuit, the burst of D pulses proportional to the input of pressure signal level, will be independent of the frequency of the oscillator circuit. As may be seen in FIG. 4, if the frequency is greater the time during which the pressure signal is integrated will be shorter, since counter 72 will reach its capacity in a shorter period of time. Therefore the negative going portion of the integrator output will be shortened as represented at 201. However, since the maximum negative voltage level reached by 201 is less, the positive going portion 205 of the waveform will also be shorter since the return to 0 volts will be achieved in a shorter period of time by the reset voltage. Since the D pulses are generated during this time period, the same number of pulses will be passed although the time period is shortened due to the increased frequency of the pulses, thereby compensating for the higher frequency.

The reverse is true for a lower frequency as represented by a greater negative peak 202 and a greater positive going portion 203. The longer time period represented by 203 will allow the same number of lower frequency oscillator pulses to be passed as D pulses, thereby compensating for the lower frequency. The same time-related characteristics of the integrator output waveform compensate for variations in integrator gain and render the circuit insensitive to integrator gain changes.

Figure 3:
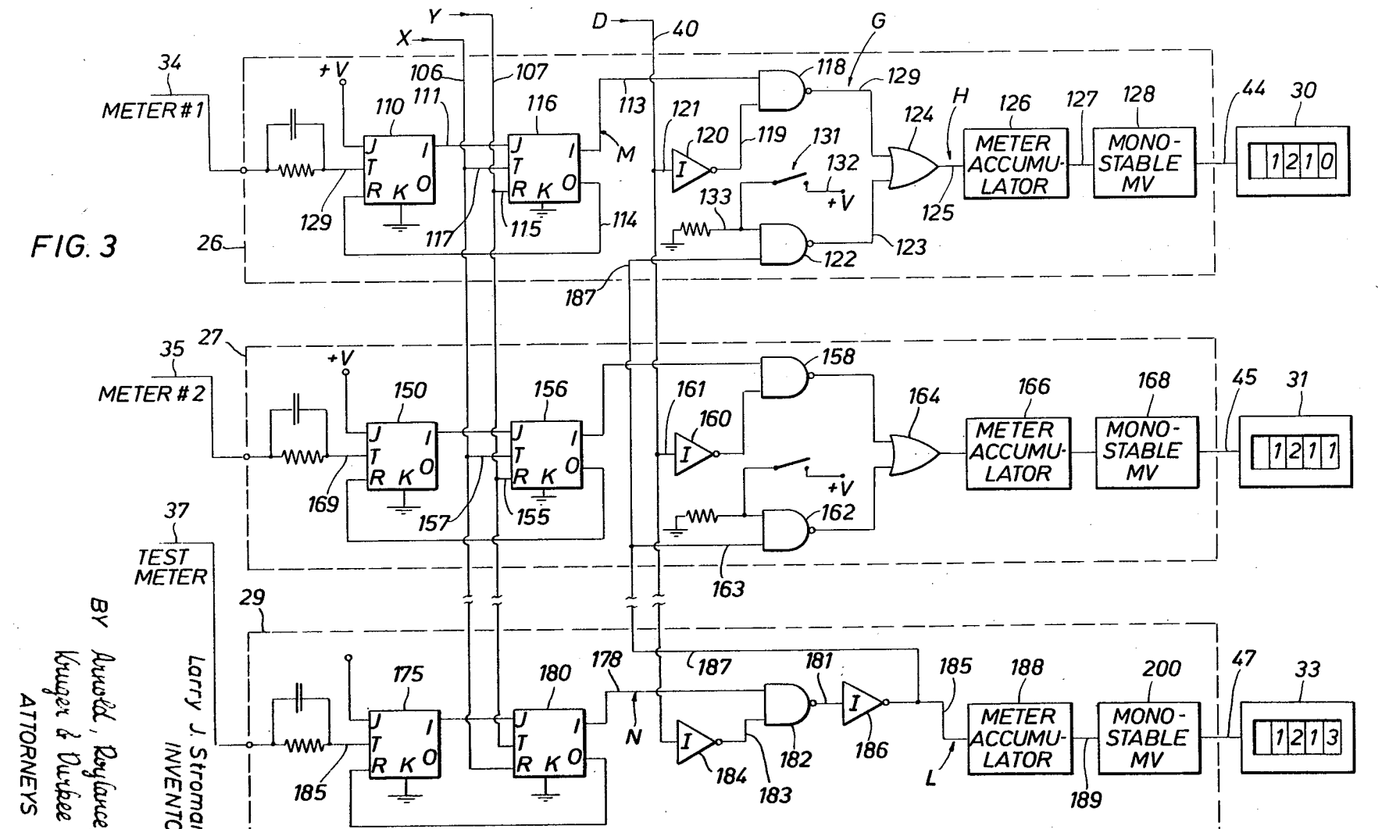
FIG. 3 is an electrical schematic of the multiplying circuits utilized by the digital multiplying means.

Referring now to FIGS. 1, 3 and 4, the multiplying circuits of the pressure compensator 8 are shown. The D-pulses (the burst of oscillator pulses proportional to the input pressure signal) are applied via conductors 40 and 121 to an inverter circuit 120 of the first multiplier circuit 26 and via conductors 40 and 161 to an inverter circuit 160 of the second multiplier circuit 27. The D-pulses are also applied via conductor 40 to any additional multiplier circuit channels (see FIG. 1), and as an input to an inverter circuit 184 in the test circuit.

The X pulse output of NAND gate 84 (see FIG. 2) is applied via conductors 106 and 117 as the trigger input to a bistable circuit 116 in the first multiplier channel, and via conductors 106 and 157 as the trigger input to a bistable circuit 156 in the second multiplier channel. The X pulses are also applied via conductor 106 to any additional multiplier channels that may be utilized, and are also applied as a reset input to a bistable circuit 180 of the test circuit.

The Y pulse output of NAND gate 86 (see FIG. 2) is applied via conductors 107 and 115 as a reset input to the bistable circuit 116 of the first multiplier circuit. The Y pulses are also applied via conductor 107 and 155 to the reset input of bistable circuit 156 of the second multiplier channel, and via conductor 107 to any additional multiplier channels desired to be utilized. Y pulses are also supplied via conductor 107 to the trigger input of the bistable circuit 180 of the test circuit.

Digital pulses generated by flowmeters 10, 11 and 13 are transmitted via conductors 34, 35 and 37 as inputs to multiplier circuits 26, 27 and 29, respectively. Of course, any additional N number of flowmeters 12 (see FIG. 1) may be utilized and the digital pulses generated by such flowmeters would be applied via a typical conductor 36 to a corresponding N number of multiplier circuits, shown generally at 28. Since the circuitry of each circuit 26, 27, and 28 are identical, a detailed description of the circuit and its operation will be made for only the first multiplier 26, and will be equally applicable to the remaining multiplier circuits. However, test multiplier circuit 29 is modified and will be described in detail.

A flowmeter signal, indicating that a measured quantity of gas has passed through the flowmeter 10 is applied via conductor 34 through an RC coupling network to the trigger input 129 of bistable circuit 110 of multiplier circuit 26. Circuit 110 is a JK configuration connected for operation as a latching circuit. When a flowmeter pulse is received at the trigger input 129 of bistable device 110, the 1 output of the bistable circuit 110 goes to a high level and is applied via conductor 111 to the J input of a bistable circuit 116. The 1 output of circuit 110 will only be high when a flowmeter pulse is received. The high 1 output of circuit 110 prepares bistable circuit 116 to operate when an X signal is applied via conductors 106 and 117 to the trigger input. If the J input to bistable circuit 116 is low, the received X signal will not effect circuit 116. If, however, the J input of bistable circuit 116 is high, indicating that a meter pulse signal has been received, the next incoming X signal will trigger bistable circuit 116 via conductor 106 and 117 causing the 1 output of circuit 116 to go high. The 1 output of circuit 116 will remain high until a Y pulse is applied via conductors 107 and 115 to the reset input of bistable circuit 116. The state of bistable circuit 116 is then changed and the 1 output goes low. The resulting waveform appearing in conductor 113 is shown as M in FIG. 4. The 0 output of circuit 116 is applied via conductor 114 to the reset input of bistable circuit 110 to reset the latching circuit 110 when the X pulse has been received by bistable circuit 116, thus preparing circuit 110 to receive the next triggering meter pulse.

The 1 output of bistable circuit 116 is applied via conductor 113 to one input of NAND gate 118. D pulses from inverter 120 are applied via conductor 119 to the other input of NAND gate 118. When the 1 output of bistable circuit 116 is high, during the time interval between successive X and Y pulses after a received meter pulse as shown at M in FIG. 4, gate 118 is enabled and passes the received D pulses. The passed D pulses (see signals sampled at G of FIG. 3) are passed via conductor 129 as one input to OR gate 124. The timing of signals X and Y are such that X occurs before the burst of D pulses have been received by inverter 120, and signal Y occurs after the conclusion of the burst of D pulses. If bistable circuit 116 is enabled, the X and Y pulses create a positive waveform or "window" (shown at M of FIG. 4), during which a burst of received D pulses will be passed to OR gate 124. Thus each received meter signal is multiplied by a burst of D pulses digitally related to the magnitude of the pressure exerted on the gas flow, to be passed to the accumulator and the counter.

The burst of pulses applied to OR gate 124 will be passed via conductor 125 to a meter accumulator circuit 126. Accumulator 126 may conveniently be any conventional counting circuit having a capability of counting a predetermined number of discrete D pulses and generating a single pulse output when the counter has reached its maximum counting capability. When accumulator 124 has reached its counting capability, an output pulse is generated and applied via conductor 127 to a monostable multivibrator or "one-shot" 128.

The one-shot circuit 128 may be any conventional monostable multivibrator circuit that may be utilized for driving the coil of an electromechanical counter 30. One-shot circuit 128 receives the accumulator 126 output pulse and is triggered to its unstable state and produces an output pulse applied via conductor 44 to the coil (not shown) of counter 30. One-shot circuit 128 then returns to its stable state to await the next accumulator pulse. Counter 30 may be any conventional readout or display counter, either electronic or electromechanical. The accumulator pulses applied via one-shot 128 will be registered in counter 30 as the corrected standard measurement of the gas flowing through flowmeter 10 (see FIG. 1).

As hereinbefore described, the additional conversion circuits 27, 28, etc., are identical to the circuit 26 hereinbefore described, and will not be described.

Referring now to FIGS. 1, 2, 3 and 4, if valve 48 is shutoff and valve 49 is opened, the gas flowing in line A1 will be diverted through line 17 to a test flowmeter 13 and discharged through line 21 to the transfer pipeline 22 as hereinbefore described. The flow through line 14 and flowmeter 10 will be reduced by the amount of gas flow diverted to test meter 13, and meter 10 will register a correspondingly smaller flow measurement than normal.

The meter signal from flowmeter 13 is applied via conductor 37 through an RC coupling network to the trigger input 185 of a bistable multivibrator 175 (see FIG. 3). Bistable multivibrators 175 and 180 are JK connected bistable circuits utilized for latching circuit purposes identical to circuits 110 and 116 previously described in detail. A high 1 output of bistable circuit 180 will be applied via conductor 178 as one input to NAND gate 182, when Y and X pulses via conductors 106 and 107 are received, if bistable circuit 175 has been triggered by a meter pulse. Note that the application of the X and Y pulses to the inputs of bistable circuit 180 is reversed from that of circuits 116 and 156. The Y pulse is applied to the trigger input of bistable circuit 180, however, circuit 180 is not triggered until the first Y pulse arrives after the test meter signal has ended. The X pulse will reset bistable circuit 180. It may be seen that the test circuit 29 will operate between successive Y and X pulses, while the other multiplying circuits operate between successive X and Y pulses. This alternation of time periods allows the test circuit pulses to be added back into one of the multiplying circuits without interference.

D pulses via conductor 40 are applied through inverter 184 and conductor 183 to the other input of NAND gate 182. With a high enabling signal level present at the 1 output of bistable circuit 180, gate 182 will pass the D pulses applied as an input through conductor 183. The D pulses are applied out of gate 182 through conductor 181 to a conventional inverter circuit 186. The inverted D signals are applied through conductor 185 as an input to an accumulator or counting circuit 188. The accumulator circuit 188 is identical to the accumulator circuit hereinbefore described for first multiplier circuit.

When accumulator 188 has reached its capacity, an output pulse is generated and transmitted via conductor 189 to the input of a conventional monostable multivibrator circuit 200. One-shot circuit 200 generates a pulse applied via conductor 47 to counter 33 to register the corrected gas flowmeter reading.

As previously discussed, the reading of flowmeter 10, channeled through multiplier circuit 26 and registered on meter 30 will reflect a reduced flow due to the diversion of line A1 through the test flowmeter 13. However, compensator circuit 8 provides a means of registering the flow of line A1 in counter 33 and simultaneously adding the corrected flow determined in the test circuit 29 back into the first channel for registering the total cumulative flow in counter 30.

The inverted D pulses are also applied via conductors 185 and 187 to one input of NAND gate 122 in the first multiplier circuit 26. Similarly, the inverted D pulses are applied via conductors 185, 187 and 163 to one input of NAND gate 163 of multiplier circuit 27, and via other conductors (not shown) to corresponding NAND gates in other channels. The other input to NAND gate 122 is normally resistively coupled to ground potential via conductor 133, thereby disabling NAND gate 122 and inhibiting the passage of inverted D pulses via conductor 187. However, if it is desired to add into converter circuit 26 the corrected flow measured in the test circuit 29, switch 131 is closed, thereby applying a positive voltage level via conductors 132 and 133 to gate 122. With gate 122 thus enabled, the inverted D pulses transmitted via conductor 187 are passed through gate 122 and applied via conductor 123 to OR gate 124. With switch 131 closed, sampling of the output of OR gate 124 at H may be seen in FIG. 4.

Since the test circuit operates during the time period between received Y and X pulses, as hereinbefore described, the D pulses transmitted via conductor 187 and passed by gate 122 will occur during the alternate time cycle from the cycle during which the D pulses are passed by gate 118, i.e., during the time between successive X and Y pulses. Therefore, with switch 131 closed, OR gate 124 will pass a burst of D pulses from gate 118 during the X-Y time cycle, and will pass a burst of D pulses from gate 122 during the Y-X time cycle (see FIG. 4 at H). Accumulator 126 will receive the additional test circuit pulses and the diverted flow will be cumulatively totaled with the actual flow measured and corrected via pulses passing gate 118. Counter 30 will register the total corrected flow to provide the cumulative corrected station meter reading.

The above description of the digital multiplying means was based on pressure compensating gas flow measurements. If a refinement of the correction is desired by further taking into consideration temperature, the following mathematical equation is applicable:

$$Q_{SCF} = Q_{ACF} \frac{P}{P_B} \frac{T_B}{T}$$

Since $P_B$ and $T_B$ are constants, the equation may be simplified as follows:

$$Q_{SCF} = Q_{ACF}(k) \frac{P}{T}$$

where the constant $k$ represents $$\frac{T_B}{P_B}$$

The temperature function as a divisor input may be applied via conductor 39 in lieu of the reset voltage which functions as a divisor input $P_B$ in the earlier equation:

$$Q_{SCF} = Q_{ACF} \frac{P}{P_B}$$

By proper selection of circuit parameters and the voltage range of the reset signal, T signals may be applied via the reset input as a variable divisor input.

When measuring liquids, pressure is not usually an important consideration since, for most purposes, liquids are considered incompressible. However, temperature variations can greatly affect the volume of liquid and thus it is often desirable to compensate liquid measurements especially in the oil industry for temperature changes.

Referring now to FIGS. 1, 2, 3 and 5, if the fluid flowing in the pipelines A1 through N2 is a liquid, such as oil or gasoline, the digital multiplying means 8 shown in FIG. 1 may be employed for temperature compensation. The identical circuitry shown in FIGS. 2 and 3 for the digitizer and multiplying circuits may be employed.

Figure 5:
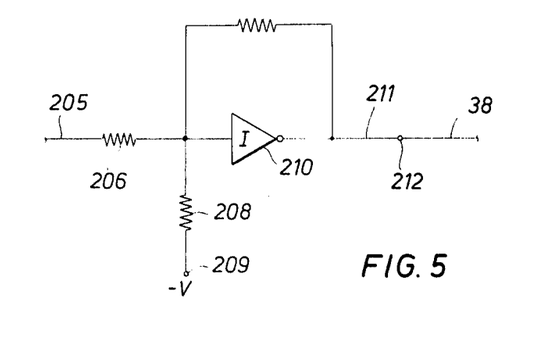
FIG. 5 is a simplified electrical schematic diagram of an input circuit for converting electrical signals representative of temperature to a predetermined function of temperature prior to application to the digitizer circuit when liquid flow measurements are made.

However, the temperature signal generated by a temperature measuring device 24 (see FIG. 1) must be translated into an additional temperature function for complying with standard measurement tables, such as ASA Z11.83–1953 for petroleum products. A translation circuit is shown in FIG. 5. The input temperature signal is applied via conductor 205, and a resistor 206 to the input of an operational amplifier 210. The voltage source 209 and resistor 208 form a second input that determines the new desired function of temperature, applied out via conductor 211 to a terminal 212 and thence to conductor 38 as an input to the digitizer circuit 25. As earlier mentioned, the applied function of temperature is digitized and applied to the multiplying circuits as hereinbefore described for the pressure correction of gas flow measurements.

Figure 6:
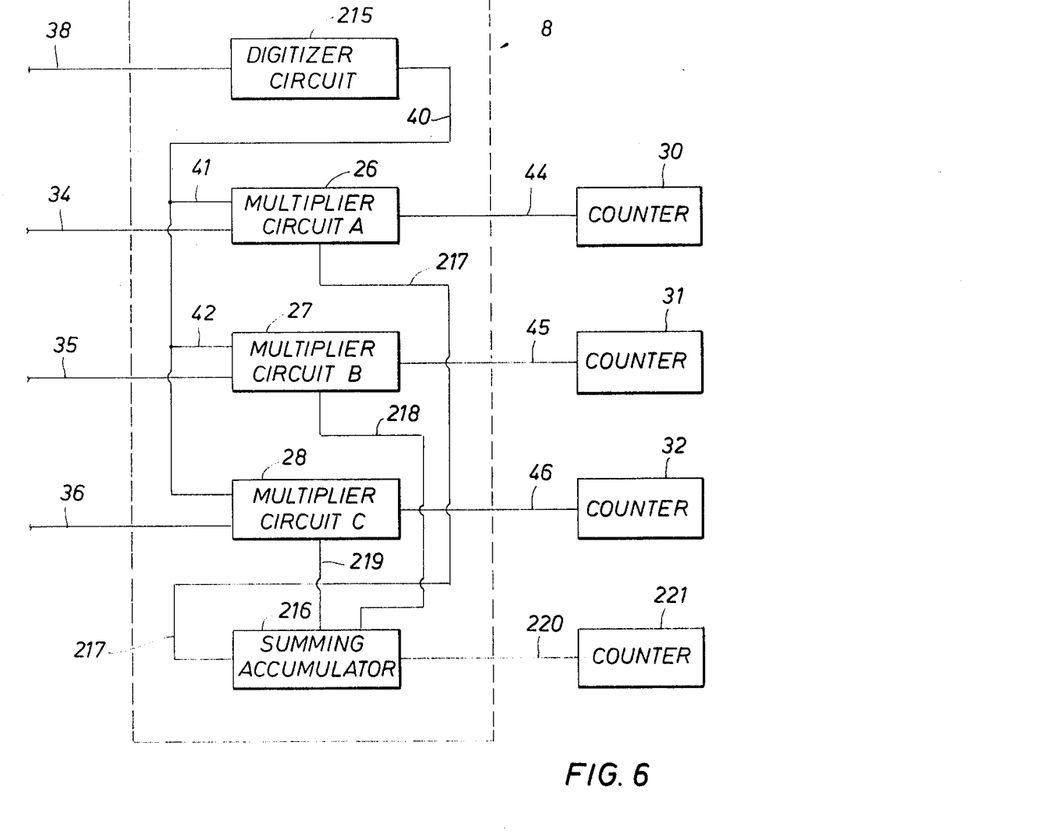
FIG. 6 is a schematic block diagram illustrating another embodiment of the digital multiplying means as it may be utilized as for converting actual fluid flow measurements to a standard measurement and summing all meter measurements to obtain total flow.

In some applications, it may be desired to determine the corrected standard measurements for each meter and then determine the total flow in the transfer pipeline 22 shown in FIG. 1. Such a total may be achieved by summing each of the corrected standard measurements made for the individual meters. The digital multiplying means 8 as shown in FIG. 1 may be modified slightly as shown in FIG. 6 to accomplish the transfer pipeline summation. Pressure or temperature would be applied via conductor 38 to a modified digitizer circuit 215. Flowmeter signals would be applied via conductors 34, 35 and 36 to multiplier circuits 26, 27 and 28 respectively. The digitized output from circuit 215 is applied via conductors 40 and 41 as an input to circuit 26, via conductors 40 and 42 to circuit 27, and via conductor 40 to circuit 28. The multiplied outputs of circuits 26, 27 and 28 are applied to counters 30, 31 and 32 via conductors 44, 45 and 46, respectively.

A summing accumulator 216 is provided for receiving the digital pulses from each of the multiplier circuits 26, 27 and 28 for summing. Accumulator 216 consists of an OR gate 124, a meter accumulator circuit 126, and a one-shot 128 identical to that shown in FIG. 3 for multiplier circuit 26. Digital pulses from multiplier circuits 26, 27 and 28 are applied via conductors 217, 218 and 219, respectively. Each of conductors 217, 218 and 219 would be applied as an input to the OR gate 124 preceding the meter accumulator 126. The OR gate would have three inputs and allow pulses present at either one of the conductors to pass to the accumulator circuit 126 as hereinbefore described for multiplier circuit 26. The accumulator output, triggered by a one-shot 128, is applied via conductor 220 to a summing counter 221.

Figure 7:
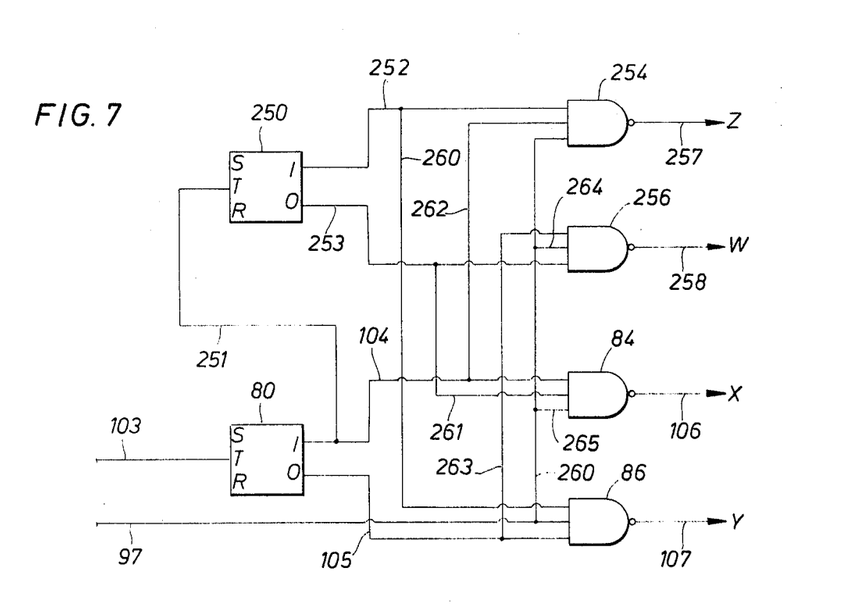
FIG. 7 is an electrical schematic of a portion of the digitizer circuit showing a modification of the control circuit generating additional control pulses.

To sum three or more meter outputs requires additional time separation of the digitized pulses for each meter channel in contrast to the two "time window" separation slots (See FIG. 4 at M and N) utilized in digitizer circuit 25. To achieve additional "time windows," the control circuitry of digitizer 25 must be modified as shown in FIG. 7.

Control bistable multivibrator 80 receives a trigger input via conductor 103. The 1 output of circuit 80 is applied via conductor 104 to one input of NAND gate 84, via conductors 104 and 251 to the trigger input of bistable circuit 250, and via conductors 104 and 262 to one input of NAND gate 254. The 0 output of bistable circuit 80 is applied via conductor 105 to one input of NAND gate 86, and via conductors 105 and 263 to one input of NAND gate 256. Conductor 97 (from the output of base counter 72 as shown in FIG. 2) applies the base counter output pulse B to a second input of NAND gate 86, and in cooperation with conductors 260, 265 and 264 apply the base counter pulse B as an input to NAND gates 84, 256 and 254. The 1 output of bistable circuit 250 is applied via conductor 252 to NAND gate 254, and via conductors 252 and 260 as another input to NAND gate 86. The 0 output of bistable circuit 250 is applied via conductor 253 to one input of NAND gate 256 and via conductors 253 and 261 to another input of NAND gate 84.

Bistable circuits 80 and 250 form a conventional "divide by four" circuit to divide the 1 output signal of bistable circuit 64 into four control signals W, X, Y and Z, applied out of NAND gates 256, 84, 86 and 254 via conductors 258, 106, 107 and 257, respectively. Four "time windows" may be utilized as follows: between successive W and X, X and Y, Y and Z, and Z and W pulses. The circuit shown in FIG. 6 would only need to employ three time windows to handle multiplier circuits 26, 27 and 28. However, the control circuitry shown in FIG. 7 would allow a fourth "time window" for summing purposes. Of course, other frequency dividers may be used to achieve additional "time windows" and allow additional channels for summing.

Figure 8:
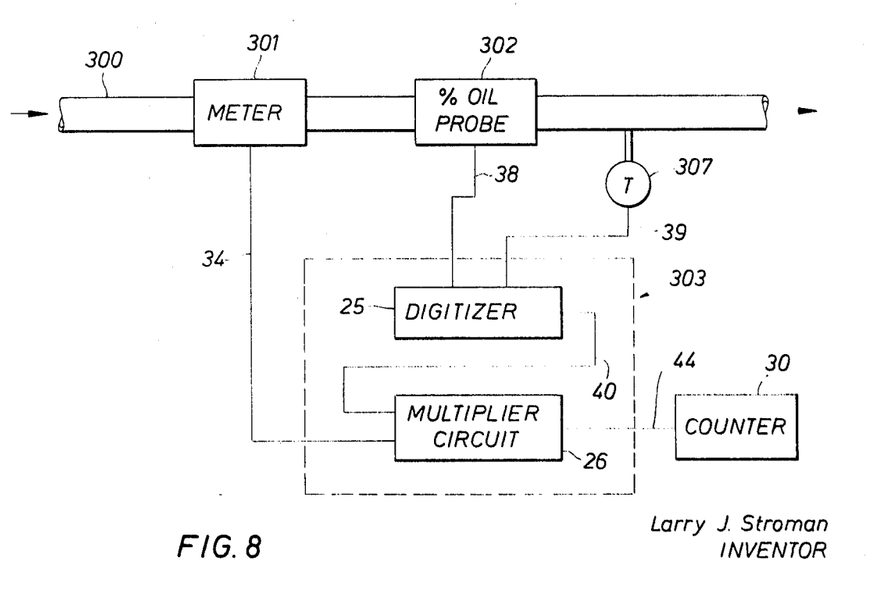
FIG. 8 is a schematic block diagram illustrating another embodiment of the digital multiplying means as it may be utilized for determining the volume of oil flowing in a pipeline when the total flow includes oil, salt water and other contaminants.

Another application of the digital multiplying circuit invention disclosed herein is shown in FIG. 8. Crude oil, salt water and other fluids are shown flowing in pipeline 300. A flowmeter 301 measures the flow of the fluid in the pipe. A capacitance probe device 302 measures the quantity of oil in the total flow and generates a "percentage oil" output signal applied via conductor 38 as the input to a digitizer circuit 25, identical to the circuit disclosed in FIG. 2 and hereinabove described. The meter pulse output is applied via conductor 34 as an input to a multiplier circuit 26, identical to the multiplier circuit 26 shown in FIG. 3.

A temperature signal, generated by measuring device 307, is applied via conductor 39 to the digitizer 25. The "percentage oil" signal is applied via conductor 38 to the digitizer circuit in place of the usual temperature or pressure input signal. The temperature signal, via conductor 39, is applied as a division input in place of the reset voltage utilizing a function generating circuit as shown in FIG. 5. The output of the digitizer 25 is applied via conductor 40 to multiplier circuit 26, the output of which is applied via conductor 44 to counter 30.

Utilizing the above-described circuitry, the total oil in the fluid flowing in pipeline 300 may be determined and simultaneously temperature corrected by solving the following equation:

$$OIL_{TF} = \frac{(MP)(\%OIL)}{F(T)}$$

where:
$OIL_{TF}$ represents the total flow of oil;
MP represents the meter pulse;
%OIL represents the percentage of oil in the fluid; and
F(T) represents the correction factor for the temperature of the fluid.

The output of digitizer 25 will be a digitized signal representative of the factor %OIL/F(T) and applied via conductor 40 to the multiplying circuit 26 to be multiplied by the number of meter pulses received via conductor 34 as hereinbefore described. The multiplied output, of course, is displayed in counter 30.

In some measurement applications, it may be desirable to provide more than one multiplication input. A second multiplication input may be achieved in the manner shown in FIG. 9. An oscillator A, which may be identical to the oscillator circuit shown in FIG. 2 or any other suitable oscillator circuit, is shown applying its input via conductor 310 as one input via conductor 310 as one input to NAND gate 76. NAND gate 76 is enabled and disabled by the application of the 0 output of bistable circuit 64 as hereinbefore described. The oscillator pulses of oscillator A control the operation of the base counter 72 as hereinbefore described in regard to FIG. 2.

Figure 9:
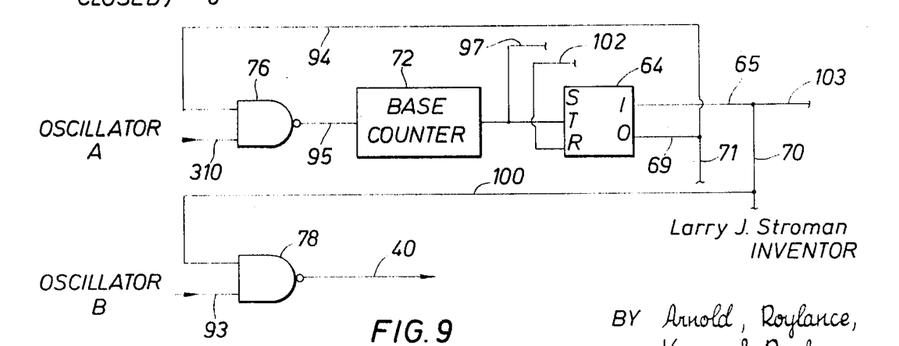
FIG. 9 is an electrical schematic of a portion of the digitizer circuit showing a modification of the oscillator gating circuit and the use of an additional oscillator to achieve a second multiplication input.

A second oscillator B is shown applying its output via conductor 93 to the input of NAND gate 78, the operation of which is controlled by the 1 output of bistable circuit 64 via conductors 65, 70 and 100. NAND gate 78 passes the pulses of oscillator B via conductor 40 as D pulses, hereinbefore described in detail with regard to FIGS. 2 and 4. By selecting different frequencies for oscillators A and B, the ratio of the number of pulses passed by gates 76 and 78 will reflect the ratio of the two selected frequencies, thereby providing in effect, a second multiplier. The first multiplier input is, of course, applied via conductor 38 to the input switching circuit of digitizer 25 as previously described. The ratio between the frequencies of oscillators A and B will provide another multiplier if desired according to the following equation:

$$Q_{OUT} = (MP)(E_{IN})\left(\frac{f_B}{f_A}\right)$$

where:
$Q_{OUT}$ is the measured quantity desired;
MP represents the number of meter pulses;
$E_{IN}$ is the signal applied via conductor 38 as the input to digitizer 25;
$f_B$ is the frequency of oscillator B; and
$f_A$ is the frequency of the oscillator A.

In all of the applications discussed, the flowmeters shown may be of either the positive displacement or the turbine type. In using turbine meters with the digital multiplying circuitry herein disclosed, additional conventional circuitry would be necessary to divide down the high frequency pulses generated by the turbine meter prior to applying the meter pulses as an input to the multiplying circuits.

Numerous variations and modifications may obviously be made in the structure herein described without departing from the present invention. Accordingly, it should be clearly understood that the forms of the invention herein described and shown in the FIGS. of the accompanying drawings are illustrative only and are not intended to limit the scope of the invention.

I claim:

1. In a system for measuring the actual volume of pipeline fluid flowing at prevailing temperature and pressure conditions and correcting the actual volume measured to a standard volume at base temperature or pressure conditions, the combination comprising:

at least one flowmeter for measuring the actual volume of fluid flowing in at least one pipeline at existing temperature and pressure conditions, said meters generating a first digital signal representative of a predetermined volume of measured fluid;

measuring means for measuring at least one of the parameters of pressure and temperature of the fluid flowing in the pipeline and generating analog electrical signals representative of each of said measured parameters;

a digitizer circuit for receiving said analog electrical signals and converting said analog signals to a second digital signal functionally related to the magnitude of said at least one measured parameter;

at least one multiplying circuit for receiving said first and second digital signals and multiplying said first signal by said second signal to produce a third digital signal representative of the product of said first and second signals;

at least one counting circuit for receiving said third digital signals and counting a predetermined number of said signals corresponding to a standard volume of said fluid, said means generating a fourth digital signal representative of each of said standard volumes counted; and recording means for receiving said fourth digital signals from each of said counting circuits and registering said signals to record the standard volume of the measured fluid for each of said flowmeters.

2. The combination as described in claim 1, including means for applying said third digital signals from one of said multiplier circuits to a selected one of the remaining multiplier circuits for adding said third digital signals from said one multiplier circuit to the third digital signals of said selected one of the remaining multiplier circuits.

3. The combination as described in claim 1, including:

summing circuit means for receiving said third digital signals from each of said multiplier circuits and generating a fifth digital signal representative of the sum of said third digital signals; and a counting circuit for receiving said fifth digital signal and counting a predetermined number of said signals corresponding to a standard volume of said fluid for counting the total standard volume of the measured fluid passing through all of said flowmeters.

4. The combination as described in claim 1, including a digitizer circuit for receiving the analog electrical signal representative of pressure as a multiplier input and the analog electrical signal representative of temperature as a divisor input for converting said analog signals to a second digital signal functionally related to the magnitude of said analog pressure signal divided by said analog temperature signal.

5. The combination as described in claim 1, wherein said digitizer circuit includes:

an input switching circuit for receiving said at least one analog electrical signal representative of pressure or temperature and a predetermined reset signal;

an oscillator circuit for generating a continuous series of electrical pulses;

a base counter circuit for receiving and counting a predetermined number of said electrical pulses generated by said oscillator circuit and generating a first electrical control signal in response thereto;

an integrator circuit for receiving said at least one analog electrical signal from said input switching circuit and integrating said signal as a function of time;

a control circuit receiving said first electrical control signal and generating a second electrical control signal applied to said input switching circuit for switching off said at least one analog electrical signal representative of pressure or temperature, and applying said predetermined reset signal to said integrator circuit;

a level detector for detecting a predetermined level to which said integrated signal is driven by said reset signal and generating a third electrical control signal in response thereto, said third control signal being applied to said control circuit for generating a fourth electrical control signal applied to said input switching circuit for switching off said predetermined reset signal and reapplying said at least one analog signal to said integrator circuit; and oscillator gating means responsive to said second control signal for passing said series of electrical pulses from said oscillator during the time period said predetermined reset signal is applied to said integrator circuit, said oscillator gating means responsive to said fourth control signal for passing said series of electrical pulses from said oscillator to said base counter during the time period said at least one analog electrical signal is applied to said integrator circuit.

6. A digital multiplying circuit for pressure compensating actual measurements of a gas flow to a standard volume at a base pressure, comprising:

at least one flowmeter for measuring the actual volumes of gas flow under existing pressure conditions, said meters generating a first digital signal representative of a predetermined volume of measured gas;

pressure measuring means for measuring the pressure of the gas flow and generating a first analog electrical signal representative of said measured pressure;

digitizing means for receiving said first analog electrical signals and digitizing said signals to form a second digital signal representative of the magnitude of said measured pressure;

at least one multiplying circuit for receiving said first and second digital signals and multiplying said first signal by said second signal to produce a third digital signal representative of the product of said first and second signals;

at least one counting circuit for counting a predetermined number of said third digital representative of a standard volume of the gas and generating a fourth digital signal representative of each of said standard volumes counted; and recording means for receiving said fourth digital signals and registering said signals to record said standard volumes of measured gas.

7. The digital multiplying circuit as described in claim 6, including means for adding said third digital signals from at least one of said multiplier circuits to a selected one of the remaining multiplier circuits.

8. The circuit as described in claim 6, including:

summing circuit means for receiving said third digital signals from each of said multiplier circuits and generating a fifth digital signal representative of the sum of said third digital signals; and a counting circuit for receiving said fifth digital signal and counting a predetermined number of said signals corresponding to a standard volume of said fluid for counting the total standard volume of the measured fluid passing through all of said flowmeters.

9. The circuit as described in claim 6, wherein said digital multiplying circuit further compensates actual gas flow measurement to a standard volume at a base temperature in addition to compensation at a base pressure wherein said circuit further includes:

temperature measuring means for measuring the temperature of the gas flow and generating a second analog electrical signal representative of said measured temperature; and digitizing means for receiving said first analog signal representative of pressure as a multiplier input and the second analog signal representative of temperature as a divisor input for converting said analog signals to a second digital signal functionally related to the magnitude of said first analog signal divided by said second analog signal.

10. The circuit as described in claim 6, wherein said digitizer circuit includes:
an input switching circuit for receiving said at least one analog electrical signal representative of pressure and a predetermined reset signal;
an oscillator circuit for generating a continuous series of electrical pulses;
a base counter circuit for receiving and counting a predetermined number of said electrical pulses generated by said oscillator circuit and generating a first electrical control signal in response thereto;
an integrator circuit for receiving said at least one analog electrical signal from said input switching circuit and integrating said signal as a function of time;
a control circuit receiving said first electrical control signal and generating a second electrical control signal applied to said input switching circuit for switching off said at least one analog electrical signal representative of pressure, and applying said predetermined reset signal to said integrator circuit;
a level detector for detecting a predetermined level to which said integrated signal is driven by said reset signal and generating a third electrical control signal in response thereto, said third control signal being applied to said control circuit for generating a fourth electrical control signal applied to said input switching circuit for switching off said predetermined reset signal and reapplying said at least one analog signal to said integrator circuit; and
oscillator gating means responsive to said second control signal for passing said series of electrical pulses from said oscillator during the time period said predetermined reset signal is applied to said integrator circuit, said oscillator gating means responsive to said fourth control signal for passing said series of electrical pulses from said oscillator to said base counter during the time period said at least one analog electrical signal is applied to said integrator circuit.

11. Apparatus for measuring the actual volume of oil in a fluid flowing in a pipeline, comprising:
at least one flowmeter for measuring the actual volume of fluid flowing in at least one pipeline, said meters generating a first digital signal representative of a predetermined volume of measured fluid;
measuring means for measuring the temperature of the fluid flowing in the pipeline and generating a first analog electrical signal representative of said measured temperature;
means for measuring the percentage of oil in said fluid and generating a second analog signal representative of said percentage;
a digitizer circuit for receiving said first analog electrical signal as a division input signal and receiving said second analog signal as a multiplier input signal, and converting said analog signals to a second digital signal directly proportional to the magnitude of said second analog signal divided by said first analog signal;
at least one multiplying circuit for receiving said first and second digital signals and multiplying said first signal by said second signal to produce a third digital signal representative of the product of said first and second signals;
at least one counting circuit for receiving said third digital signals and counting a predetermined number of said signals corresponding to a known volume of said oil, said means generating a fourth digital signal representative of each of said known volumes counted; and
recording means for receiving said fourth digital signals from each of said counting circuits and registering said signals to record the standard volume of the measured oil.

12. The apparatus as described in claim 11, wherein said digitizer circuit includes:
an input switching circuit for receiving said first and second analog electrical signals;
an oscillator circuit for generating a continuous series of electrical pulses;
a base counter circuit for receiving and counting a predetermined number of said electrical pulses generated by said oscillator circuit and generating a first electrical control signal in response thereto;
an integrator circuit for receiving said first analog electrical signal from said input switching circuit and integrating said signal as a function of time;
a control circuit receiving said first electrical control signal and generating a second electrical control signal applied to said input switching circuit for switching off said first analog electrical signal and applying said second analog electrical signal to said integrator circuit;
a level detector for detecting a predetermined level to which said integrated signal is driven by said second analog signal and generating a third electrical control signal in response thereto, said third control signal being applied to said control circuit for generating a fourth electrical control signal applied to said input switching circuit for switching off said second analog signal and reapplying said first analog signal to said integrator circuit; and
oscillator gating means responsive to said second control signal for passing said series of electrical pulses from said oscillator during the time period said second analog electrical signal is applied to said integrator circuit, said oscillator gating means responsive to said fourth control signal for passing said series of electrical pulses from said oscillator to said base counter during the time period said first analog electrical signal is applied to said integrator circuit.